(12) United States Patent
Booth et al.

(10) Patent No.: US 6,197,195 B1
(45) Date of Patent: Mar. 6, 2001

(54) FLUID HANDLING APPARATUS AND FLOW CONTROL ASSEMBLY THEREFOR

(75) Inventors: Walter A. Booth, East Hanover; Leonard Falcone, Lake Hopatcong; Florito C. Montano, Union, all of NJ (US)

(73) Assignee: H-Tech, Inc., Wilmington, DE (US)

( * ) Notice: Subject to any disclaimer, the term of this patent is extended or adjusted under 35 U.S.C. 154(b) by 0 days.

(21) Appl. No.: 09/277,912

(22) Filed: Mar. 29, 1999

(51) Int. Cl.[7] .................................................. B01D 35/12
(52) U.S. Cl. .................. 210/340; 210/421; 137/454.6; 137/625.15; 137/630.17; 251/315.1
(58) Field of Search ................... 210/340, 341, 210/238, 253, 405, 418, 420, 421, 424, 450; 137/545, 630.17, 625.15, 625.43, 454.5, 454.6; 251/292, 315.1

(56) References Cited

U.S. PATENT DOCUMENTS

| | | |
|---|---|---|
| 1,634,086 | 6/1927 | Scoville . |
| 2,977,969 | 4/1961 | Weikly . |
| 3,066,909 | 12/1962 | Reed, Jr. . |
| 3,536,295 | 10/1970 | Sinkler ................................. 251/164 |
| 3,595,270 * | 7/1971 | McNeal, Jr. ......................... 137/595 |
| 3,618,781 | 11/1971 | Brown ................................... 210/341 |
| 3,679,060 | 7/1972 | Smith . |
| 3,757,956 | 9/1973 | Bradel et al. ........................ 210/333 |
| 3,900,400 | 8/1975 | Whitfield ............................ 210/238 |
| 3,900,401 * | 8/1975 | Oliver et al. ........................ 210/238 |
| 3,914,176 | 10/1975 | Holmes ............................... 210/132 |
| 4,046,695 | 9/1977 | Tucker ................................. 210/340 |
| 4,113,228 | 9/1978 | Frye .................................... 251/159 |
| 4,274,445 | 6/1981 | Cooper ............................... 137/636.1 |
| 4,460,012 * | 7/1984 | Koumi et al. ...................... 137/454.6 |
| 4,467,832 | 8/1984 | Tamamori ....................... 137/625.47 |
| 4,496,463 | 1/1985 | Desai et al. .......................... 210/341 |
| 4,504,390 | 3/1985 | Steffen ............................... 210/333.1 |
| 4,606,820 * | 8/1986 | Rea et al. ............................. 210/130 |
| 4,615,800 | 10/1986 | Stifelman et al. ................... 210/132 |
| 4,786,409 | 11/1988 | Miller .................................. 210/238 |
| 4,877,056 | 10/1989 | Comte et al. ....................... 137/599 |
| 4,921,598 | 5/1990 | Desch .................................. 210/136 |
| 4,936,989 | 6/1990 | Walker .............................. 210/333.1 |
| 4,969,994 * | 11/1990 | Misgen et al. ....................... 210/450 |
| 5,064,454 | 11/1991 | Pittman ................................. 55/302 |
| 5,073,260 * | 12/1991 | Wilkendorf ......................... 210/341 |
| 5,426,679 | 6/1995 | Henriksson ........................... 210/98 |
| 5,443,722 * | 8/1995 | Desai et al. ......................... 210/253 |
| 5,453,184 * | 9/1995 | Handtmann ......................... 210/193 |

\* cited by examiner

*Primary Examiner*—David A. Simmons
*Assistant Examiner*—Frank M. Lawrence
(74) *Attorney, Agent, or Firm*—Selitto & Associates

(57) ABSTRACT

A flow control assembly is provided with a cartridge which includes a body sized and shaped so as to be received in a housing of fluid handling apparatus, such as duplex strainers and diverter valves. The body has a first chamber and a second chamber adjacent to the first chamber. The first chamber includes a first fluid inlet and first and second fluid outlets, while the second chamber includes second and third fluid inlets and a third fluid outlet. A first valve is movably positioned in the first chamber. The first valve is movable between a first position, in which fluid passes from the first fluid inlet to the first fluid outlet, and a second position, in which fluid passes from the first fluid inlet to the second fluid outlet. A second valve is also movably positioned in the second chamber. The second valve is movable between a third position, in which fluid passes from the second fluid inlet to the third fluid outlet, and a fourth position, in which fluid passes from the third fluid inlet to the third fluid outlet. A moving mechanism is provided for conjointly moving the first and second valves such that the first valve is in the first position when the second valve is in the third position and such that the first valve is in the second position when the second valve is in the fourth position.

9 Claims, 10 Drawing Sheets

FLUID HANDLING APPARATUS AND FLOW CONTROL ASSEMBLY THEREFOR

FIELD OF THE INVENTION

The present invention relates to fluid handling apparatus (e.g., liquid strainers) and flow control assemblies therefor and, more particularly, to flow control assemblies adapted for facilitating assembly and disassembly of fluid handling apparatus.

BACKGROUND OF THE INVENTION

In the past, various ball valves have been developed for use in fluid handling apparatus (e.g., duplex strainers and filters). For instance, U.S. Pat. No. 5,443,722 discloses a duplex strainer having an upper ball valve and a lower ball valve housed within a housing of the strainer, while U.S. Pat. No. 3,900,401 discloses a filter having a pair of filter elements and a pair of ball valves mounted within a housing of the filter. These ball valves are typically mounted directly within the housings, and, as a result, they are installed directly in the housings during assembly of the fluid handling apparatus. Because of the large number of components associated with the ball valves (e.g., valve seats, valve stems, valve seals), installation and removal of the ball valves to and from the housings are made difficult and time-consuming.

Some plug-type or similar valves have been housed in liners or sleeves (see, for instance, U.S. Pat. Nos. 2,977,969, 3,066,909 and 4,467,832). However, because these liners or sleeves are not specifically designed for ball valves, they are not adapted for use in installing ball valves in associated fluid handling apparatus. In the foregoing circumstances, there is a need for a device for facilitating installation and removal of ball valves to and from fluid handling apparatus.

SUMMARY OF THE INVENTION

The present invention overcomes the disadvantages and shortcomings of the prior art discussed above by providing a new and improved flow control assembly adapted for use in fluid handling apparatus, such as duplex strainers and diverter valves. More particularly, the flow control assembly is provided with a cartridge which includes a body sized and shaped so as to be received in a housing of the fluid handling apparatus. The body has a first chamber and a second chamber adjacent to the first chamber. The first chamber includes a first fluid inlet and first and second fluid outlets, while the second chamber includes second and third fluid inlets and a third fluid outlet. A first valve is movably positioned in the first chamber. The first valve is movable between a first position, in which fluid passes from the first fluid inlet to the first fluid outlet, and a second position, in which fluid passes from the first fluid inlet to the second fluid outlet. A second valve is also movably positioned in the second chamber. The second valve is movable between a third position, in which fluid passes from the second fluid inlet to the third fluid outlet, and a fourth position, in which fluid passes from the third fluid inlet to the third fluid outlet. A moving mechanism is provided for conjointly moving the first and second valves such that the first valve is in the first position when the second valve is in the third position and such that the first valve is in the second position when the second valve is in the fourth position.

BRIEF DESCRIPTION OF THE DRAWINGS

For a more complete understanding of the present invention, reference is made to the following detailed description of exemplary embodiments considered in conjunction with the accompanying drawings, in which.

DETAILED DESCRIPTION OF THE EXEMPLARY EMBODIMENTS

Figure 1:
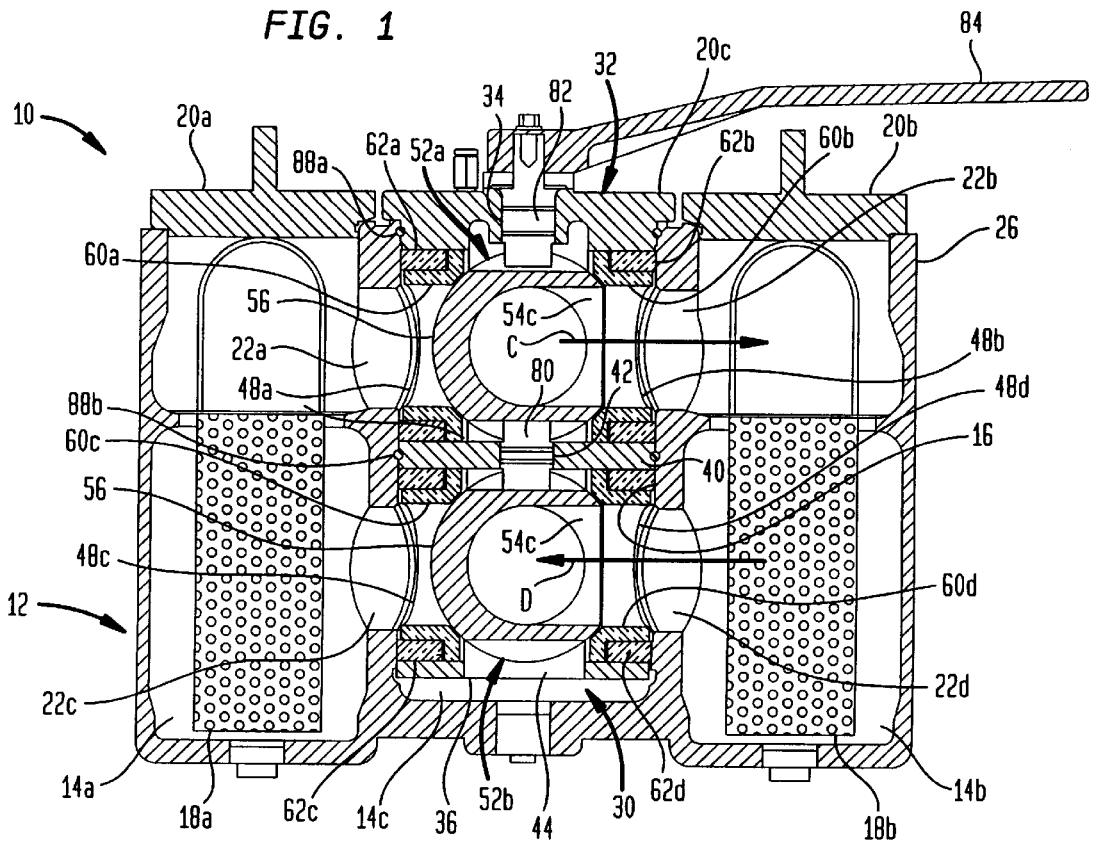
FIG. 1 is a cross-sectional view of a duplex strainer constructed in accordance with the first embodiment of the present invention and equipped with a flow control assembly therein, the flow control assembly being in one of its operating positions.
Figure 2:
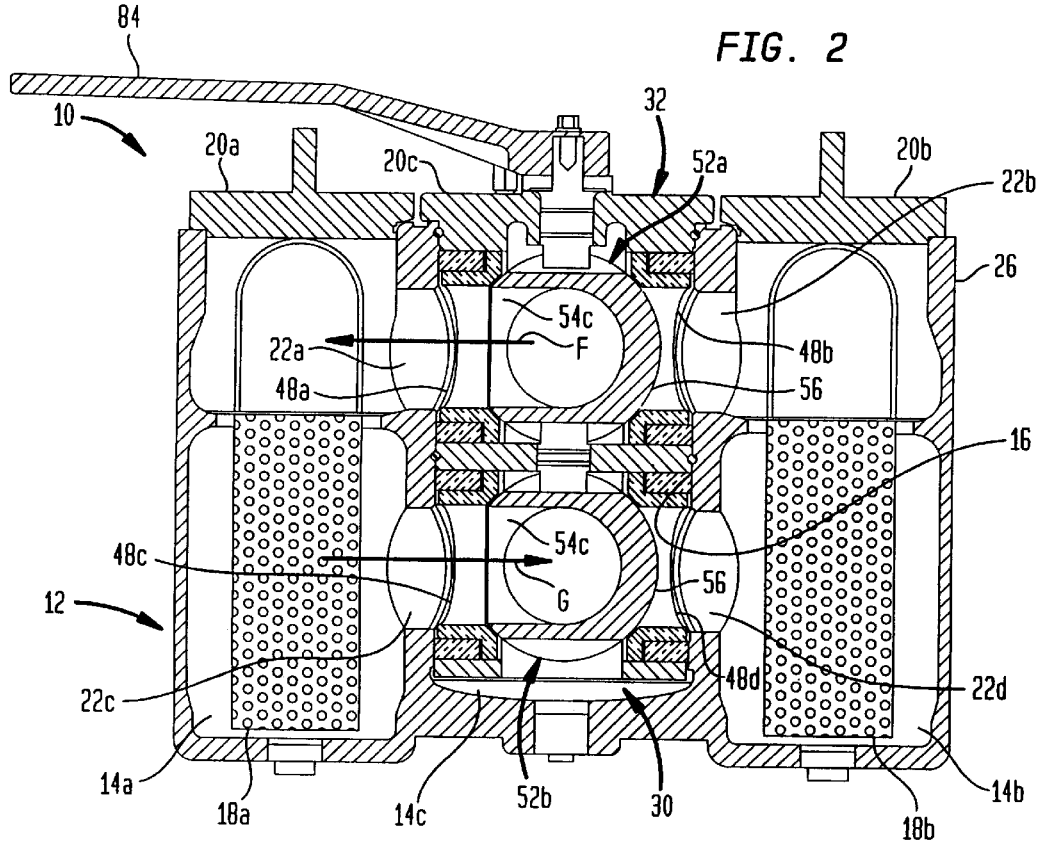
FIG. 2 is a view identical to FIG. 1, except that the flow control assembly is in another of its operating position.
Figure 3:
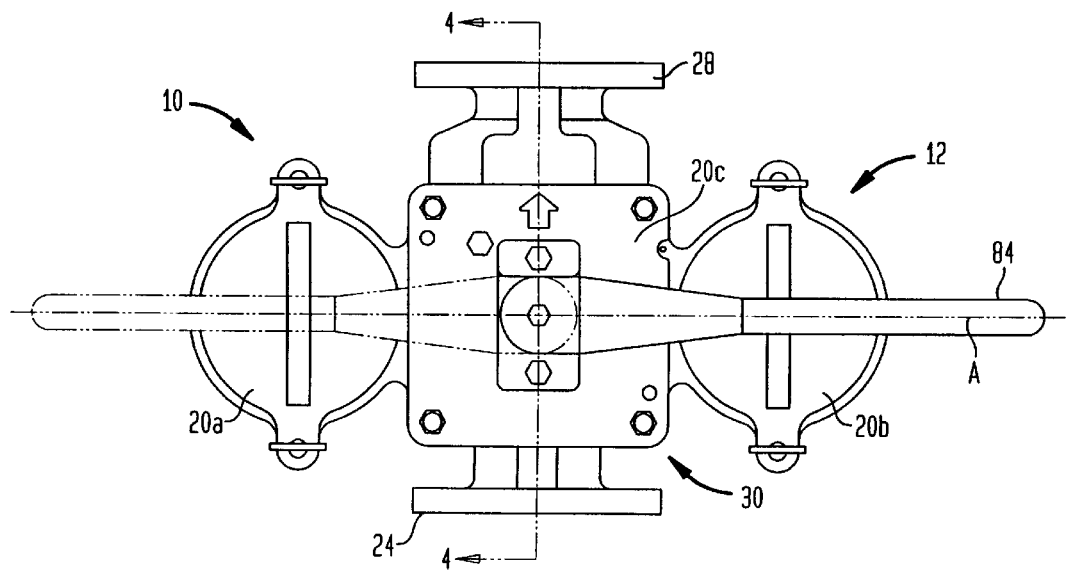
FIG. 3 is a top plan view of the duplex strainer shown in FIGS. 1 and 2.

FIGS. 1 and 2 show a duplex strainer 10 constructed in accordance with a first embodiment of the present invention. The duplex strainer 10 includes a housing 12 having a pair of outer bores 14a, 14b and an intermediate bore 14c positioned between the outer bores 14a, 14b. More particularly, the outer bores 14a, 14b and the intermediate bore 14c, which is delimited by an inner cylindrical wall 16 of the housing 12, are linearly arranged in an axial direction substantially parallel to a longitudinal axis A of the housing 12 (see FIG. 3). Strainer baskets 18a, 18b are mounted in the outer bores 14a, 14b, respectively, while caps 20a, 20b are secured to the housing 12 for closing off the outer bores 14a, 14b, respectively, in a liquid-tight manner. Upper orifices 22a, 22b and lower orifices 22c, 22d are also provided in the inner wall 16 of the housing 12. More particularly, the upper and lower orifices 22a, 22c are formed in a portion of the inner wall 16 between the outer and intermediate bores 14a, 14c, while the upper and lower orifices 22b, 22d are formed in an opposite portion of the inner wall 16 between the outer and intermediate bores 14b, 14c. The housing 12 also includes an inlet 24 (see FIGS. 3 and 4), which has an inlet orifice 24a (see FIG. 4) formed in the inner wall 16 adjacent an upper end 26 of the housing 12, and an outlet 28 (see FIGS. 3 and 4) which has an outlet orifice 28a (see FIG. 4) formed in the inner wall 16 adjacent a lower end of the housing 12.

Figure 4:
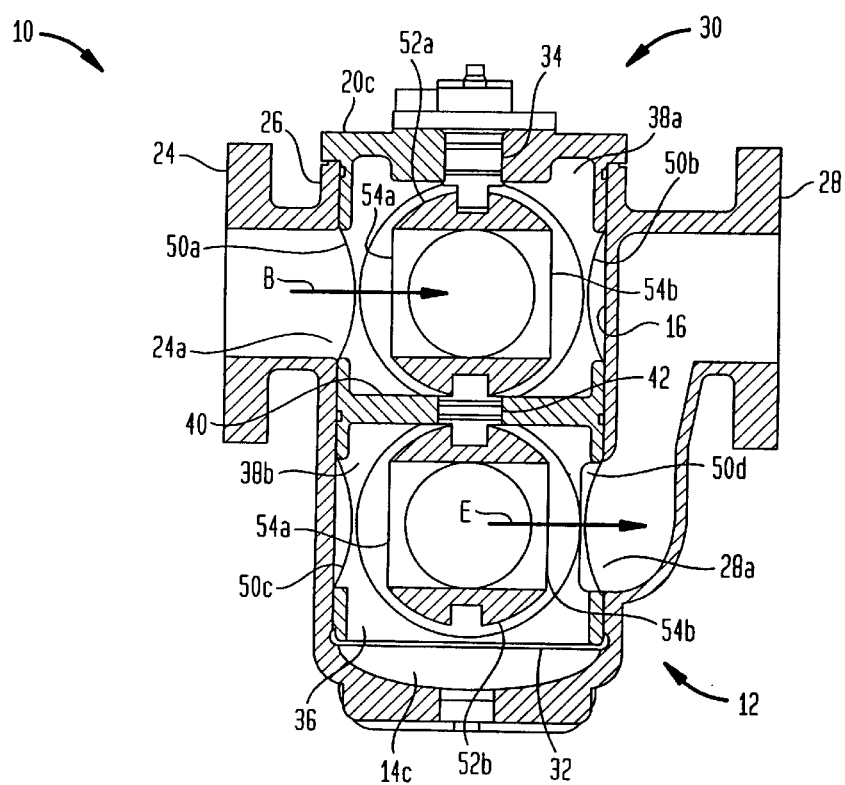
FIG. 4 is a cross-sectional view, taken along section line 4—4 and looking in the direction of the arrows, of the duplex strainer shown in FIG. 3.
Figure 5:
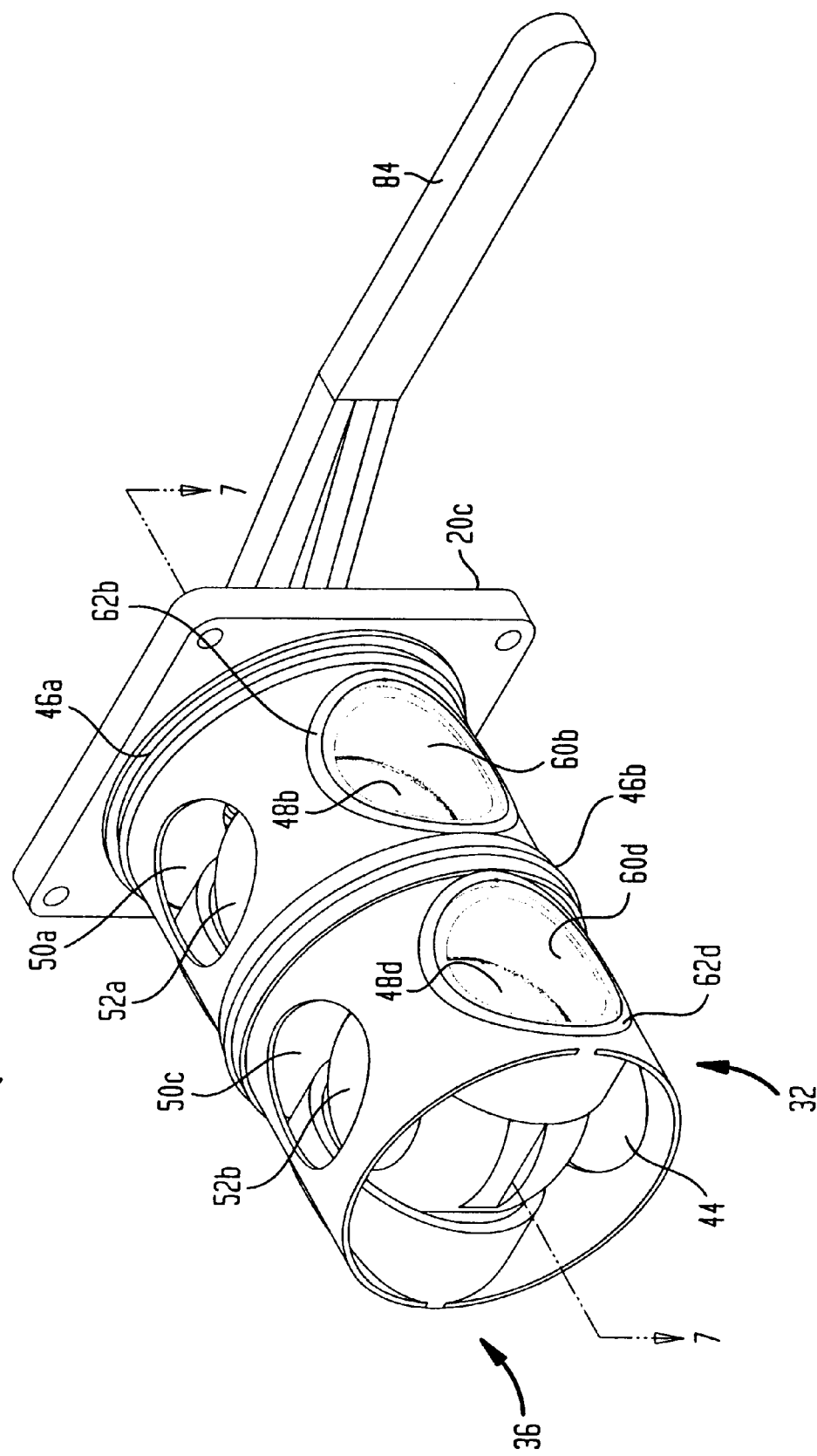
FIG. 5 is a perspective view of the flow control assembly shown in FIGS. 1, 2 and 4.
Figure 6:
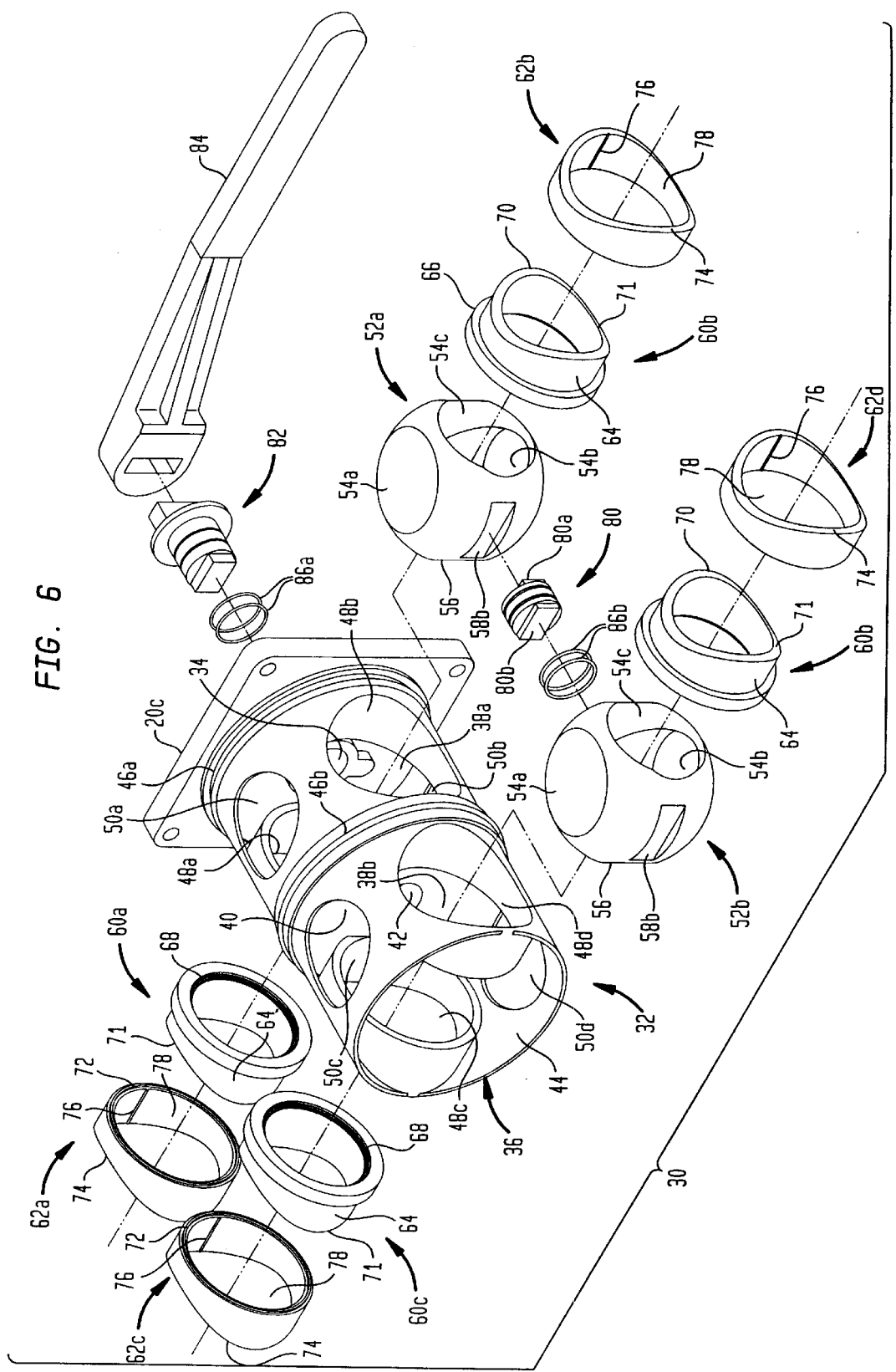
FIG. 6 is an exploded perspective view of the flow control assembly shown in FIGS. 1, 2, 4 and 5.
Figure 7:
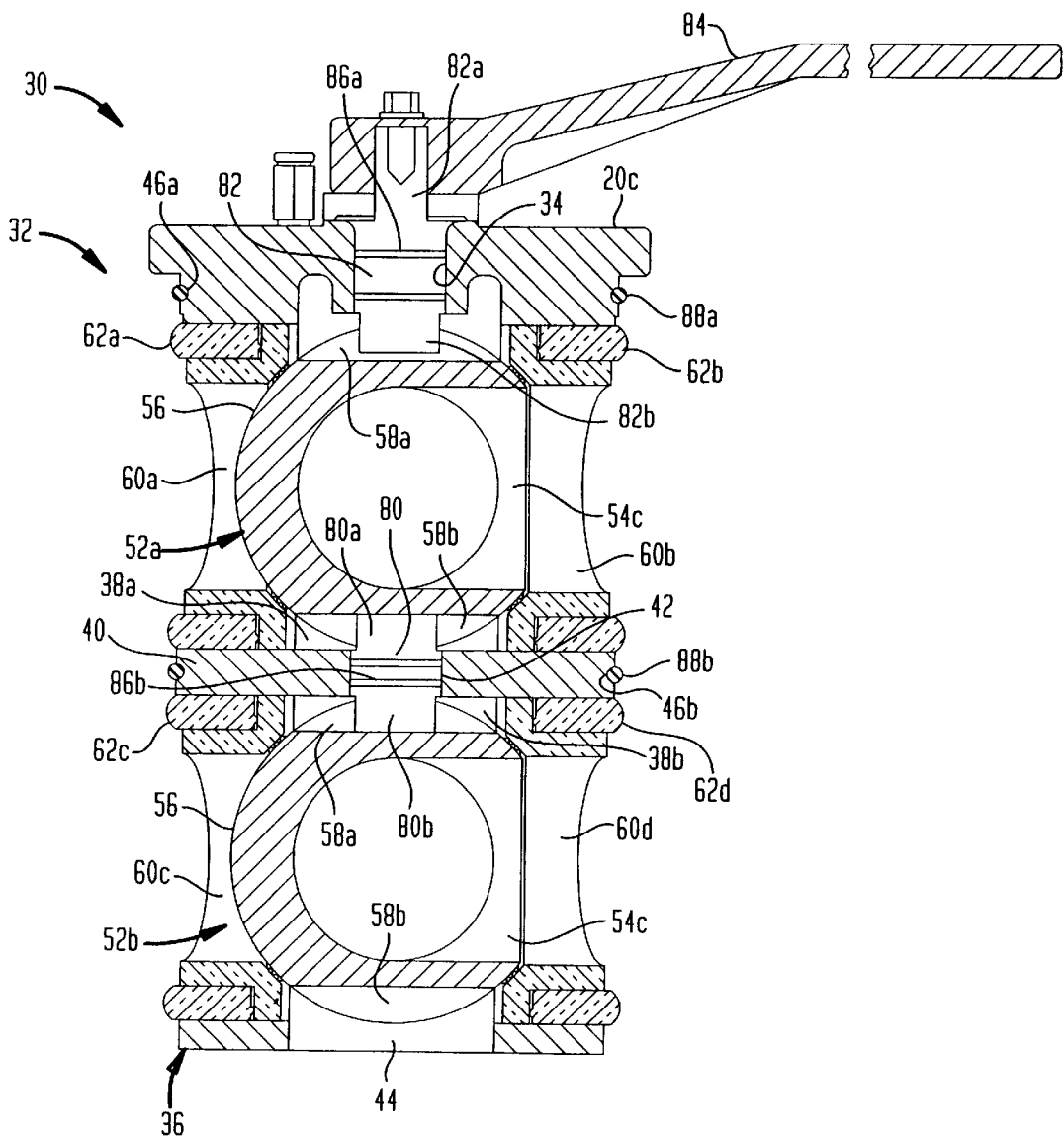
FIG. 7 is a cross-sectional view, taken along section line 7—7 and looking in the direction of the arrows, of the flow control assembly shown in FIG. 5.
Figure 8:
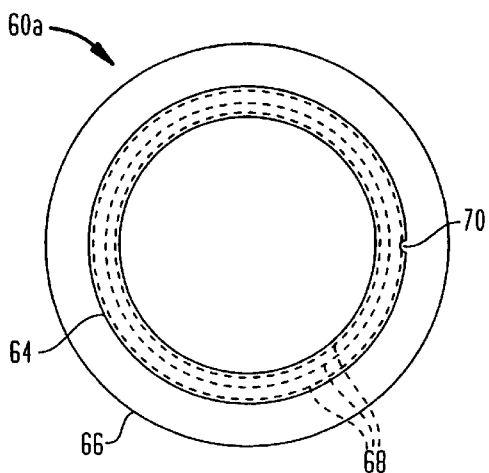
FIG. 8 is a top plan view of a seat member of the flow control assembly shown in FIGS. 1, 2 and 4–7.
Figure 9:
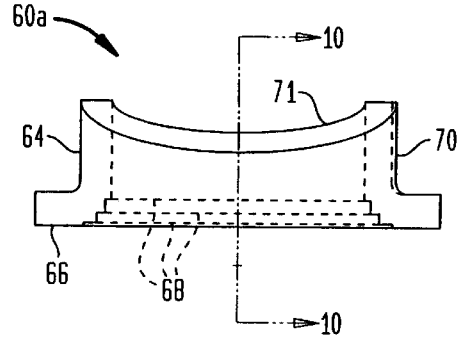
FIG. 9 is a side-elevational view of the seat member shown in FIG. 8.
Figure 10:
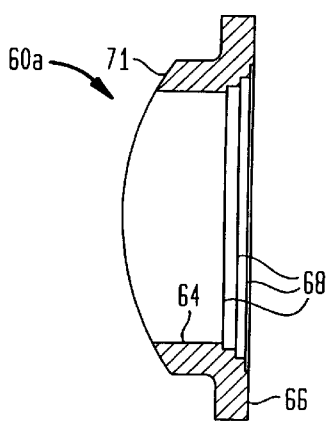
FIG. 10 is a cross-sectional view, taken along section line 10—10 and looking in the direction of the arrows, of the seat member shown in FIG. 9.
Figure 11:
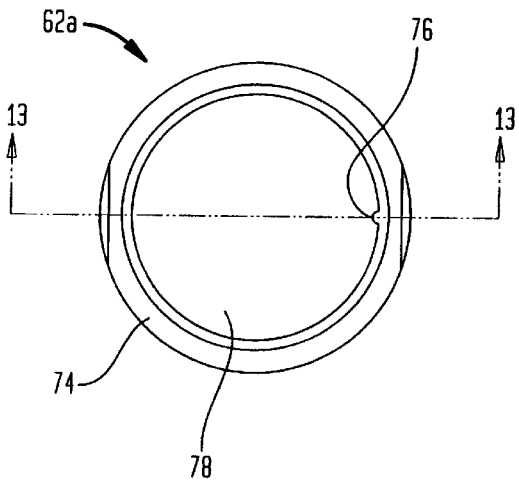
FIG. 11 is a top plan view of a seal member of the flow control assembly shown in FIGS. 1, 2 and 4–7.
Figure 12:
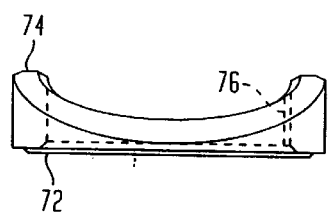
FIG. 12 is a side-elevational view of the seal member shown in FIG. 11.
Figure 13:
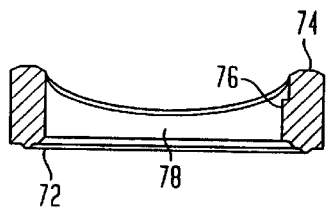
FIG. 13 is a cross-sectional view, taken along section line 13—13 and looking in the direction of the arrows, of the seal member shown in FIG. 11.

Referring generally to FIGS. 1, 2 and 4 and specifically to FIGS. 5–7, the duplex strainer 10 also includes a flow control assembly 30 associated with the intermediate bore 14c of the housing 12. The flow control assembly 30 is provided with a cartridge 32 having a cap 20c removably attached to the upper end 26 of the housing 12 and having an aperture 34 extending therethrough. The cartridge 32 also includes a cylindrical body 36 depending from the cap 20c and removably positioned in the intermediate bore 14c. Upper and lower valve chambers 38a, 38b are formed in the body 36. More particularly, the upper chamber 38a is located above the lower chamber 38b and is divided from same by a divider 40 having an aperture 42 therethrough. A bottom hole 44, which communicates with the lower chamber 38b, is formed in a bottom end of the body 36. The body 36 is also provided with an upper groove 46a adjacent the cap 20c and a lower groove 46b adjacent the divider 40 for purposes to be discussed hereinafter.

With reference to FIGS. 5–7, the body 36 is provided with a pair of upper axial holes 48a, 48b, a pair of lower axial holes 48c, 48d, a pair of upper transverse holes 50a, 50b (see FIGS. 4 and 6) and a pair of lower transverse holes 50c, 50d (see FIGS. 4 and 6). The upper axial holes 48a, 48b and the upper transverse holes 50a, 50b are formed in an upper wall portion of the body 36 and thereby communicate with the upper chamber 38a, while the lower axial holes 48c, 48d and the lower transverse holes 50c, 50d are formed in a lower wall portion of the body 36 and thereby communicate with the lower chamber 38b. More particularly, the upper axial holes 48a, 48b oppose one another in the axial direction (i.e., in a direction substantially parallel to the longitudinal axis A of the housing 12). That is, the upper axial holes 48a, 48b are arranged in the body 36 along the axial direction, and, as a result, they are aligned with the upper orifices 22a, 22b, respectively, of the housing 12 (see FIG. 1). Likewise, the lower axial holes 48c, 48d, which are formed directly below the upper axial holes 48a, 48b, respectively, oppose one another in the axial direction and are aligned with the lower orifices 22c, 22d, respectively, of the housing 12 (see FIG. 1). The upper transverse holes 50a, 50b also oppose one another in a transverse direction substantially perpendicular to the longitudinal axis A of the housing 12, and, as a result, the upper transverse hole 50a is aligned with the inlet orifice 24a of the inlet 24 (see FIG. 4). Similarly, the lower transverse holes 50c, 50d oppose one another in the transverse direction, and, as a result, the lower transverse hole 50d is aligned with the outlet orifice 28a of the outlet 28 (see FIG. 4).

Still referring to FIGS. 5–7, the flow control assembly 30 is further provided with an upper ball 52a, which is rotatably mounted in the upper chamber 38a, and a lower ball 52b which is rotatably mounted in the lower chamber 38b. The upper and lower balls 52a, 52b, which are substantially identical to one another in construction and size, have diameters which are smaller than those of the upper axial holes 48a, 48b and the lower axial holes 48c, 48d, respectively, but which are greater than those of the upper transverse holes 50a, 50b and the lower transverse holes 50c, 50d, respectively. As a result, the upper ball 52a is adapted to be inserted into the upper chamber 38a through one of the upper axial holes 48a, 48b but not through the upper transverse hole 50a or the upper transverse hole 50b. Similarly, the lower ball 52b is adapted to be inserted into the lower chamber 38b through one of the lower axial holes 48c, 48b but not through the lower transverse hole 50c or the lower transverse hole 50d. Alternatively, the transverse holes 50a, 50b and the transverse holes SOc, 50d can be designed so as to allow passage of the upper and lower balls 52a, 52b, respectively, therethrough.

Each of the upper and lower balls 52a, 52b is provided with a pair of axial openings 54a, 54b, which diametrically oppose one another and which are therefore apart from one another by about 180°, and a transverse opening 54c, which communicates with the axial openings 54a, 54b and which is apart from the axial opening 54a and the axial opening 54b by about 90°. Moreover, each of the upper and lower balls 52a, 52b has an arcuate sealing surface 56, which is located opposite the transverse opening 54c, and upper and lower slots 58a, 58b (see FIGS. 6 and 7) in upper and lower sides thereof.

Referring to FIGS. 5–7, the flow control assembly 30 is provided with a pair of upper annular seat members 60a, 60b, a pair of lower annular seat members 60c, 60d, a pair of upper annular seal members 62a, 62b and a pair of lower annular seal members 62c, 62d. The upper and lower seat members 60a–60d are made from any suitable materials, such as plastic, polypropylene and polyethylene. With reference to FIGS. 5–10, each of the upper and lower seat members 60a–60d has a cylindrical section 64, a flange 66, which projects from the cylindrical section 64, a plurality of sealing ridges 68, which are located adjacent the flange 66, and a channel 70 which is formed in an outer surface of the cylindrical section 64. Each of the cylindrical sections 64 of the upper and lower seat members 60a–60d has a free end 71 located opposite the flange 66 and having a contour substantially corresponding to the contour of a corresponding one of the upper and lower axial openings 48a–48d of the cartridge 32.

Referring to FIG. 7, the upper seat members 60a, 60b are mounted in the upper axial holes 48a, 48b, respectively, of the cartridge 32 such that the flanges 66 of the upper seat members 60a, 60b are positioned adjacent the upper ball 52a and such that the sealing ridges 68 of the upper seat members 60a, 60b engage the upper ball 52a in a liquid-tight manner. Likewise, the lower seat members 60c, 60d are mounted in the lower axial holes, 48c, 48d, respectively, of the cartridge 32 such that the flanges 66 of the lower seat members 60c, 60d are positioned adjacent the lower ball 52b and such that the sealing ridges 68 of the lower seat members 60c, 60d engage the lower ball 52b in a liquid-tight manner.

While the upper and lower seal members 62a–62d can be made from any materials suitable for performing a sealing function, they are preferably made from flexible (i.e., elastomeric) materials, such as ethylene propylene, elastomer, floro-elastomer and nitrile, for purposes to be discussed hereinafter. Referring to FIGS. 5–7 and 11–13, each of the upper and lower seal members 62a–62d has an annular sealing projection 72 on one side thereof, a sealing surface 74 on an opposite side thereof and an internal projection 76 formed on an inner annular surface thereof and sized and shaped so as to be received in a corresponding one of the channels 70 of the upper and lower seat member 60a–60d. Each of the upper and lower seal members 62a–62d also has an opening 78 therein sized and shaped so as to receive a corresponding one of the cylindrical sections 64 of the upper and lower seat members 60a–60d. More particularly, the upper seal member 62a is positioned in the upper axial hole 48a of the cartridge 32 such that the cylindrical section 64 of the upper seat member 60a is received in the opening 78 of the upper seal member 62a and such that the sealing projection 72 and the sealing surface 74 of the upper seal member 62a engage the flange 66 of the upper seat member 60a and the inner wall 16 of the housing 12 (i.e., a portion of the inner wall 16 around the upper orifice 22a), respectively, in a liquid-tight manner. The upper seal member 62b, the lower seal member 62c and the lower seal member 62d are positioned in the upper axial hole 48a, the lower axial hole 48c and the lower axial hole 48d, respectively, of the cartridge 32 in a manner substantially identical to the manner in which the upper seal member 62a is positioned in the upper axial hole 48a of the cartridge 32. In this manner, the upper ball 52a is captured between the upper seat and seal members 60a, 62a and the upper seat and seal members 60b, 62b, while the lower ball 52b is captured between the lower seat and seal members 60c, 62c and the lower seat and seal members 60d, 62d.

With reference to FIGS. 6 and 7, the flow control assembly 30 also includes a lower stem 80 rotatably mounted in the aperture 42 of the divider 40 and having an upper end 80a, which is received in the lower slot 58b of the upper ball 52a, and a lower end 80b received in the upper slot 58a of the lower ball 52b. An upper stem 82 is also rotatably mounted in the aperture 34 of the cap 20c of the cartridge 32 and has an upper end 82a, which extends outwardly from the cap 20c, and a lower end 82b received in the upper slot 58a of the upper ball 52a. A handle 84 is secured to the upper end 82a of the upper stem 82 and is pivotable between a first position, in which it extends from the upper stem 82 in the axial direction towards the outer bore 14a (see FIGS. 2 and 3), and a second position, in which it extends from the upper stem 82 in the axial direction towards the outer bore 14b (see FIGS. 1 and 3). That is, the handle 84 is pivotable about 180° between its first and second positions. Because the upper and lower balls 52a, 52b are interconnected to the handle 84 via the upper and lower stems 82, 80, they are rotatable in the upper and lower chambers 38a, 38b, respectively, between their first and second positions (see FIGS. 1 and 2) in response to pivoting movement of the handle 84.

Referring to FIGS. 1, 6 and 7, the flow control assembly 30 also includes a pair of upper sealing rings 86a, which are positioned in the aperture 34 of the cap 20c of the cartridge 32 between the cap 20c and the upper stem 82, and an upper annular seal 88a, which is received in the upper groove 46a between the body 36 of the cartridge 32 and the inner wall 16 of the housing 12, for enclosing the open top end of the intermediate bore 14c in a liquid-tight manner. Lower sealing rings 86b are also mounted in the aperture 42 of the divider 40 between the divider 40 and the lower stem 80, while a lower annular seal 88b is received in the lower groove 46b between the body 36 and the inner wall 16. The lower sealing rings 86b and the lower seal 88b are adapted to seal off the upper chamber 38a from the lower chamber 38b in a liquid-tight manner.

In assembling the duplex strainer 10, the flow control assembly 30 is pre-assembled in the manner described above so as to facilitate assembly of the duplex strainer 10. More particularly, with the lower stem 80 properly positioned in the aperture 42 of the divider 40, the upper and lower balls 52a, 52b are inserted into the upper and lower chambers 38a, 38b, respectively, through one of the upper axial holes 48a, 48b and through one of the lower axial holes 48c, 48d, respectively. Next, the upper and lower seat members 60a–60d and the upper and lower seal members 62a–62d are properly mounted in the upper and lower axial holes 48a–48d, respectively. The upper stem 82 is also inserted into the aperture 34 of the cap 20c, while the handle 84 is coupled to the upper stem 82. After its pre-assembly, the flow control assembly 30 is properly mounted in the intermediate bore 14c of the housing 12. That is, the body 36 of the flow control assembly 30 is inserted into the intermediate bore 14c, while the cap 20c is secured to the housing 12.

In operation, in order to cause liquid to flow through the strainer basket 18b, the handle 84 is pivoted to its second position, thereby rotating the upper and lower balls 52a, 52b to their second positions (see FIG. 1). With reference to FIGS. 1 and 4, when the handle 84 is in its second position, the sealing surfaces 56 of the upper and lower balls 52a, 52b are aligned with the upper and lower axial holes 48a, 48c, respectively, of the cartridge 32 and hence with the upper and lower orifices 22a, 22c, respectively, of the housing 12, thereby blocking off the upper and lower orifices 22a, 22c, respectively, in a liquid-tight manner. Moreover, the axial openings 54a of the upper ball 52a is aligned with the upper transverse hole 50a of the cartridge 32 and hence with the inlet orifice 24a of the inlet 24, while the transverse opening 54c of the upper ball 52a is aligned with the upper axial hole 48b of the cartridge 32 and hence with the upper orifice 22b of the housing 12. Likewise, the axial opening 54b of the lower ball 52b is aligned with the lower transverse hole 50d of the cartridge 32 and hence with the outlet orifice 28a of the outlet 28, while the transverse opening 54c of the lower ball 52b is aligned with the lower axial hole 48d of the cartridge 32 and hence with the lower orifice 22d of the housing 12. As a result, liquid flows to the outer bore 14b from the inlet 24 through the inlet orifice 24a and the upper transverse hole 50a of the cartridge 32 (as indicated by arrow B in FIG. 4) and then through the upper axial hole 48b of the cartridge 32 and the upper orifice 22b of the housing 12 (as indicated by arrow C in FIG. 1). After passing through the strainer basket 14b, the liquid flows from the outer bore 14b to the outlet 28 through the lower orifice 22d of the housing 12 and the lower axial hole 48d of the cartridge 32 (as indicated by arrow D in FIG. 1) and then through the lower transverse hole 50d of the cartridge 32 and the outlet orifice 28a (as indicated by arrow E in FIG. 4).

With reference to FIG. 2, in order to cause liquid to flow through the strainer basket 18a, the handle 84 is pivoted to its first position, thereby rotating the upper and lower balls 52a, 52b to their first positions. More particularly, when the handle 84 is moved to its first position, the sealing surfaces 56 of the upper and lower balls 52a, 52b are aligned with the upper and lower axial holes 48b, 48d, respectively, of the cartridge 32 and hence with the upper and lower orifices 22b, 22d, respectively, of the housing 12 so as to block off the upper and lower orifices 22b, 22d, respectively, in a liquid-tight manner. Moreover, the axial openings 54b of the upper ball 52a is aligned with the upper transverse hole 50a of the cartridge 32 and hence with the inlet orifice 24a of the inlet 24, while the transverse opening 54c of the upper ball 52a is aligned with the axial upper hole 48a of the cartridge 32 and hence with the upper orifice 22*a* of the housing 12. The axial opening 54*a* of the lower ball 52*b* is aligned with the lower transverse hole 50*d* of the cartridge 32 and hence with the outlet orifice 28*a* of the outlet 28, while the transverse opening 54*c* of the lower ball 52*a* is aligned with the lower axial hole 48*c* of the cartridge 32 and hence the lower orifice 22*c* of the housing 12. As a result, liquid flows to the outer bore 14*a* from the inlet 24 through the inlet orifice 24*a* and the upper transverse hole 50*a* of the cartridge 32 and then through the upper axial hole 48*a* of the cartridge 32 and the upper orifice 22*a* of the housing 12 (as indicated by arrow F in FIG. 2). After passing through the strainer basket 18*a*, the liquid flows from the outer bore 14*a* to the outlet 28 through the lower orifice 22*c* of the housing 12 and the lower axial hole 48*c* of the cartridge 32 (as indicated by arrow G in FIG. 2) and then through the lower transverse hole 50*d* of the cartridge 32 and the outlet orifice 28*a*.

It should be appreciated that the present invention provides numerous advantages over the prior art discussed above. For instance, because the upper and lower balls 52*a*, 52*b* and their associated components (e.g., the upper and lower seat members 60*a*–60*d* and the upper and lower seal members 62*a*–62*d*) are adapted for pre-assembly in the cartridge 32, they facilitate assembly of the duplex strainer 10. That is, because of the cartridge 32, installation of the upper and lower balls 52*a*, 52*b* in the housing 12 of the duplex strainer 10 is made significantly easy and efficient. Moreover, because the flow control assembly 30 is easily removable from the housing 12 of the duplex strainer 12 without disassembling other strainer components, periodic servicing of the flow control assembly 30 (e.g., replacement of the upper and lower seal members 62*a*–62*d*) is rendered efficient.

The upper and lower seal members 62*a*–62*d* provide additional advantages. More particularly, because the upper and lower seal members 62*a*–62*d* are made from flexible (i.e., elastomeric) materials, when subjected to different fluid pressures, the upper and lower balls 52*a*, 52*b* are movable within the chambers 38*a*, 38*b*, respectively, of the cartridge 32 so as to promote an enhanced seal between various sealing contacts (i.e., between the sealing surfaces 56 of the upper and lower balls 52*a*, 52*b* and the upper seat members 60*a*, 60*b* and the lower seat members 60*c*, 60*d*, respectively, between the upper and lower seal members 62*a*–62*d* and the upper and lower seat members 60*a*–60*d*, respectively, and between the upper and lower seal members 62*a*–62*b* and the inner wall 16 of the housing 12). Moreover, due to their flexible nature, the upper and lower seal members 62*a*–62*d* "float" in the upper and lower axial holes 48*a*–48*d*, respectively, of the cartridge 32, making them less susceptible to abrasion and thereby enhancing their operating life, as well as that of the upper and lower seat members 60*a*–60*d*.

It should be noted that the present invention can have numerous modifications and variations. For instance, the flow control assembly 30 has applications in numerous types of fluid handling apparatus other than a duplex strainer as will be discussed in greater detail hereinafter. Moreover, the upper transverse opening 50*b* and the lower transverse opening 5o*c* of the cartridge 32 are formed in the body 36 primarily for minimizing the overall weight of the cartridge 32 (i.e., they do not provide a passageway for liquid). As a result, the upper and lower transverse openings 5o*b*, 50*c* can be removed or omitted from the cartridge 32 (i.e., they can be plugged). Further, while the upper and lower balls 52*a*, 52*b* described above have a construction identical to one another, each of them can be provided with a different construction depending upon particular application requirements.

FIGS. 14 and 15 and FIGS. 16–19 depict second and third embodiments, respectively, of the present invention. Elements illustrated in FIGS. 14 and 15 and FIGS. 16–19, which correspond, either identically or substantially, to the elements described above with respect to the embodiment of FIGS. 1–13 have been designated by corresponding reference numerals increased by one hundred and two hundred, respectively. Unless otherwise stated, the embodiments of FIGS. 14–19 are constructed, assembled and operated in the same basic manner as the embodiment of FIGS. 1–13.

Figure 14:
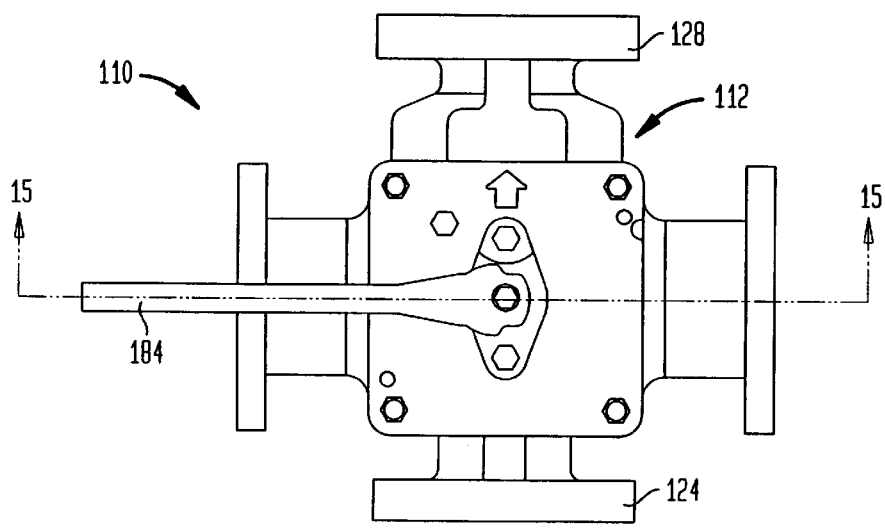
FIG. 14 is a top plan view of a diverter valve assembly constructed in accordance with a second embodiment of the present invention.
Figure 15:
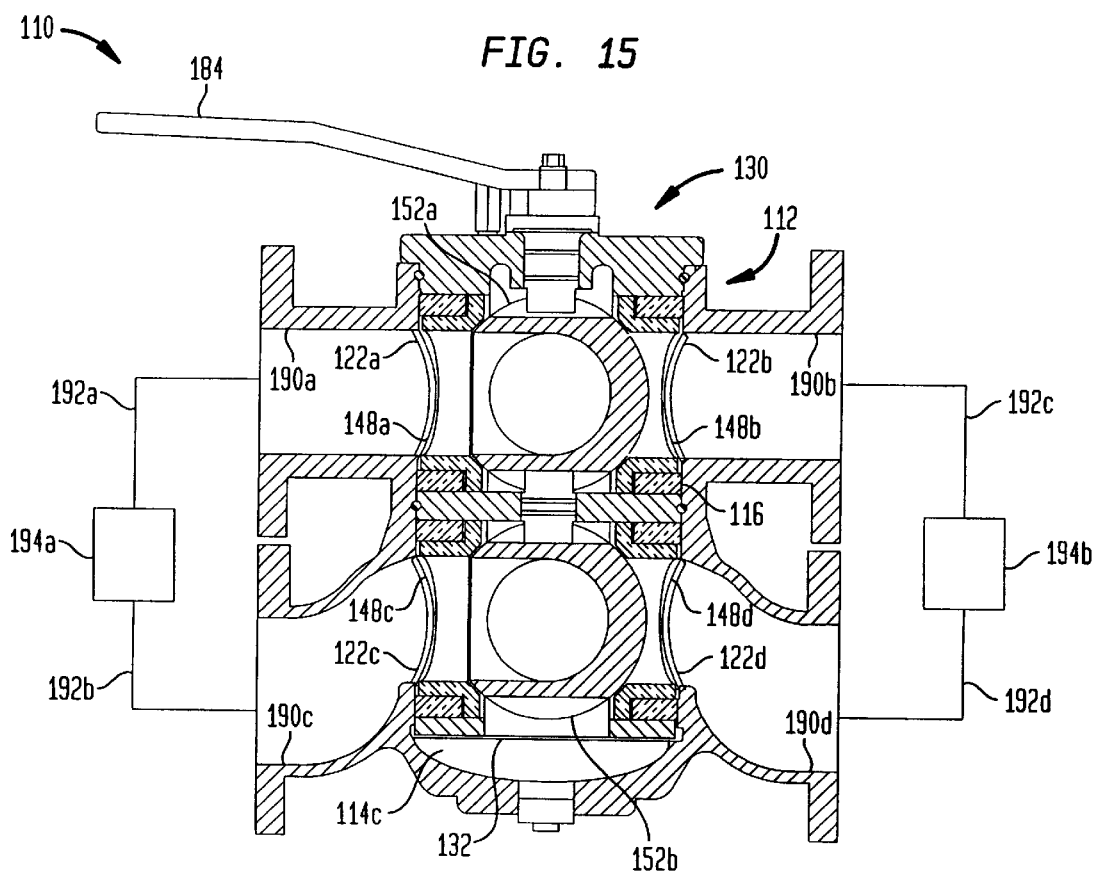
FIG. 15 is a cross-sectional view, taken along section line 15—15 and looking in the direction of the arrows, of the diverter valve assembly shown in FIG. 14.
Figure 16:
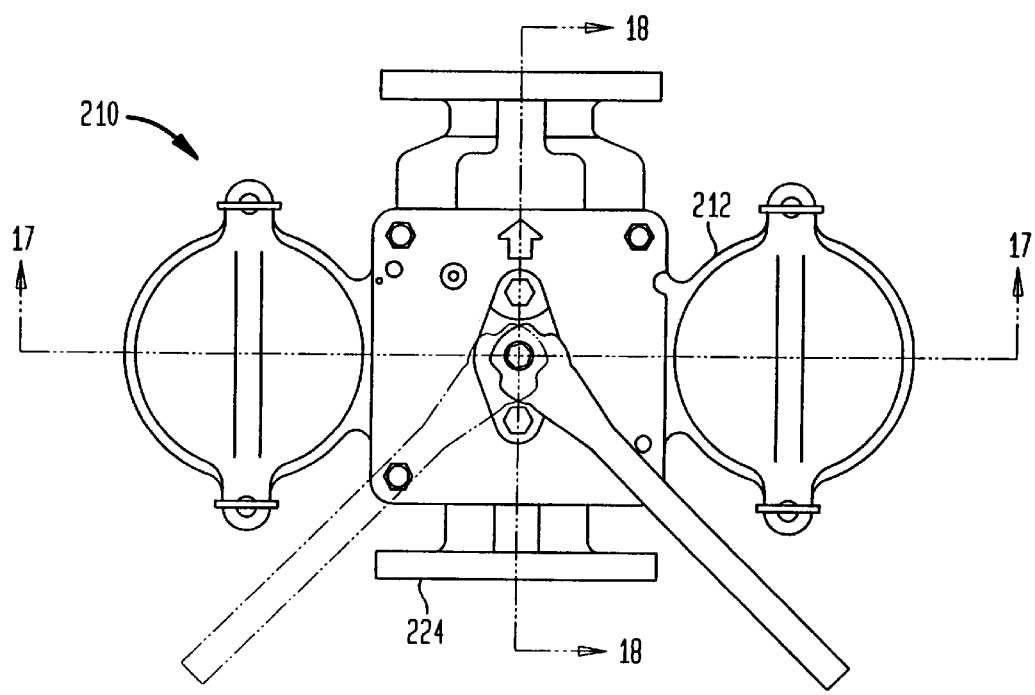
FIG. 16 is a top plan view of a duplex strainer constructed in accordance with a third embodiment of the present invention.

FIGS. 14 and 15 show a diverter valve assembly 110 constructed in accordance with a second embodiment of the present invention. More particularly, the diverter valve assembly 110 includes a housing 112 having a cylindrical bore 114*c* and an inner wall 116 defining the bore 114*c*. The housing 112 also includes an inlet 124 and an outlet 128, both of which communicate with the bore 114*c*. Upper orifices 122*a*, 122*b* and lower orifices 122*c*, 122*d* are formed in the inner wall 116, communicating with the bore 114*c*. Upper pipes 190*a*, 190*b* extend outwardly from the housing 112 and are in communication with the bore 114*c* through the upper orifices 122*a*, 122*b*, respectively, while lower pipes 190*c*, 190*d* extend outwardly from the housing 112 and are in communication with the bore 114*c* through the lower orifices 122*c*, 122*d*, respectively. The upper and lower pipes 190*a*, 190*c* are adapted to be coupled to an inlet line 192*a* and an outlet line 192*b*, respectively, of liquid conditioning equipment 194*a* (e.g., a filter), while the upper and lower pipes 190*b*, 190*d* are adapted to be coupled to an inlet line 192*c* and an outlet line 192*d*, respectively, of another liquid conditioning equipment 194*b*.

The diverter valve assembly 110 includes a flow control assembly 130 which is substantially identical to the flow control assembly 30 of the embodiment shown in FIGS. 1–13 in construction and operation. Accordingly, the flow control assembly 130 includes a cartridge 132 having a pair of upper axial holes 148*a*, 148*b*, a pair of lower axial holes 148*c*, 148*d*, a pair of upper transverse holes (not shown) and a pair of lower transverse holes (not shown). The flow control assembly 130 also includes upper and lower balls 152*a*, 152*b* mounted in upper and lower valve chambers 138*a*, 138*b*, respectively, of the cartridge 132.

A handle 184 is pivotally mounted on the cartridge 132 for rotating the upper and lower balls 152*a*, 152*b*. More particularly, the handle 184 is pivotable between its first and second positions. When the handle 184 is moved to its first position, liquid flows from the inlet 124 to the liquid conditioning equipment 194*a* through the inlet line 192*a* and then flows to the outlet 128 through the outlet line 192*b*. When the handle 184 is moved to its second position, liquid flows from the inlet 124 to the liquid conditioning equipment 194*b* through the inlet line 192*c* and then flows to the outlet 128 through the outlet line 192*d*.

FIGS. 16–19 show a duplex strainer 210 constructed in accordance with a third embodiment of the present invention. The duplex strainer 210 is substantially identical to the duplex strainer of the embodiment shown in FIGS. 1–13 in construction and operation, except as described hereinafter. The duplex strainer 210 has a housing 212 having outer bores 214*a*, 214*b* and an intermediate bore 214*c*. The housing 212, which includes an inner wall 216 defining the intermediate bore 214*c*, is provided with upper orifices 222*a*, 222*b* and lower orifices 222*c*, 222*d*, all of which are formed in the inner wall 216 and communicate with the intermediate bore 214*c*. An inlet 224 has an inlet orifice 224*a* formed in the inner wall 216. An outlet orifice 228*a* is formed adjacent a bottom end of the intermediate bore 214*c* for communication with an outlet 228 of the housing 212.

Figure 17:
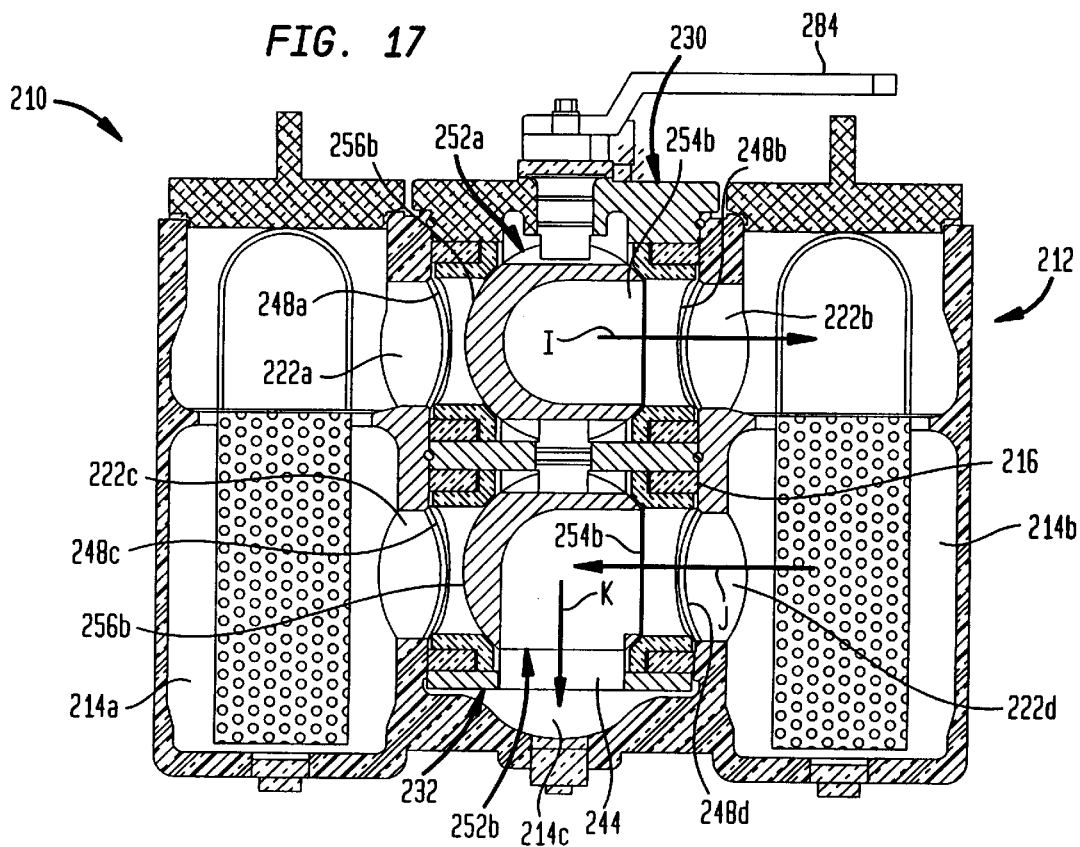
FIG. 17 is a cross-sectional view, taken along section line 17—17 and looking in the direction of the arrows, of the duplex strainer shown in FIG. 16.
Figure 18:
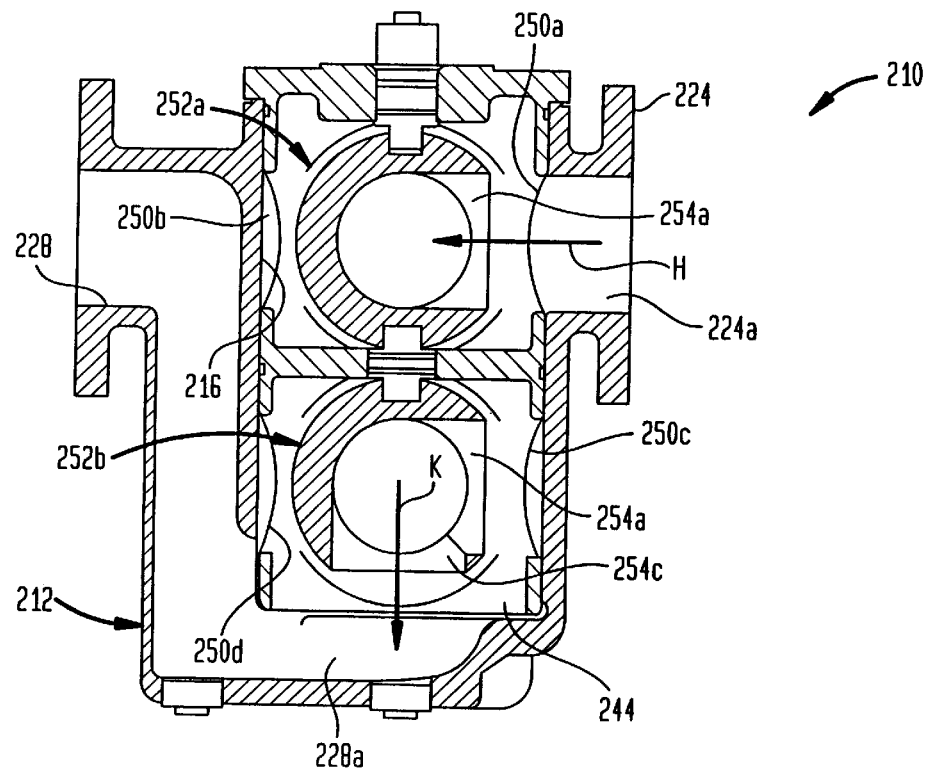
FIG. 18 is a cross-sectional view, taken along section line 18—18 and looking in the direction of the arrows, of the duplex strainer shown in FIG. 16.
Figure 19:
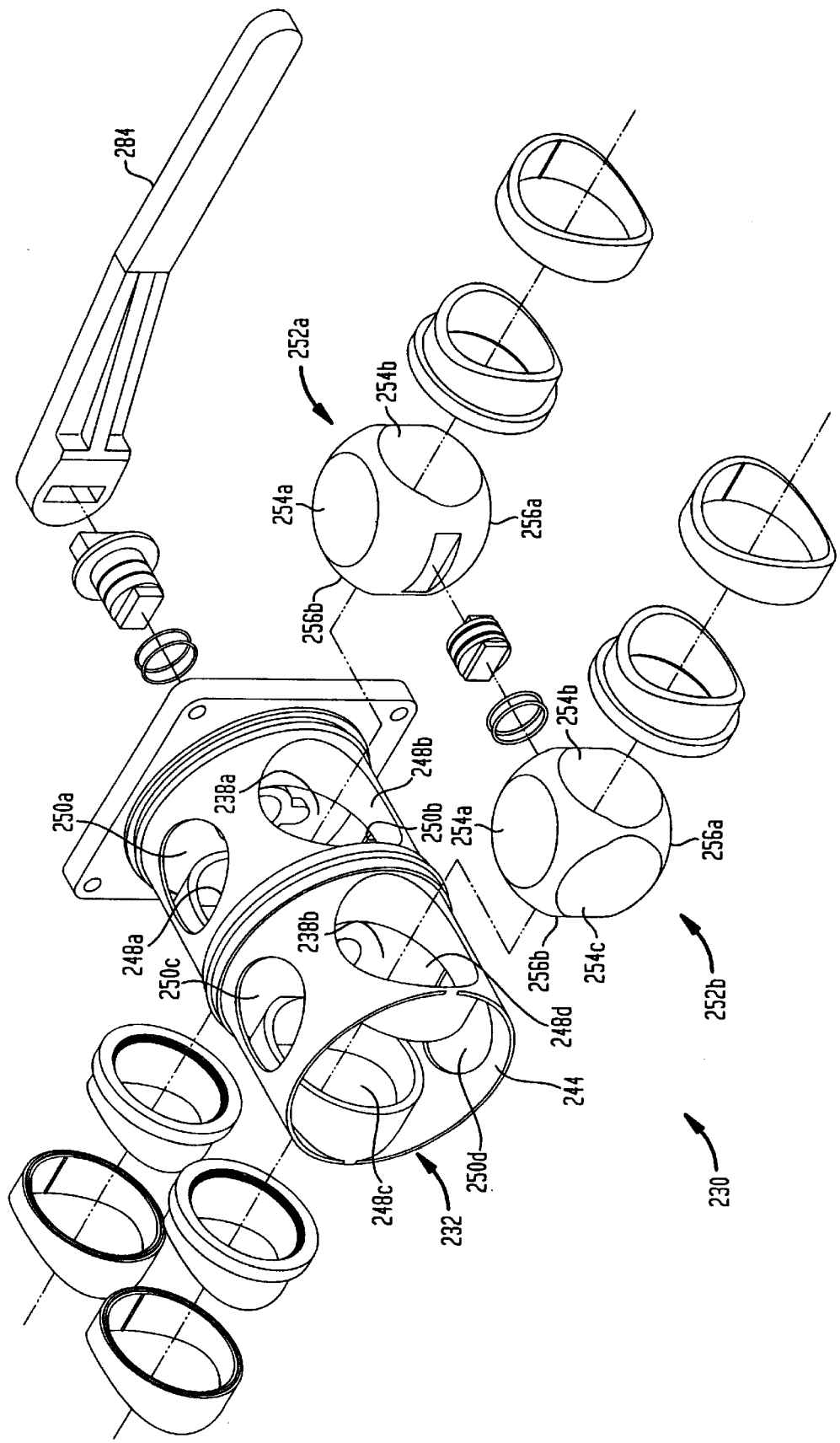
FIG. 19 is an exploded perspective view of a flow control assembly of the duplex strainer shown in FIGS. 16–18.

Referring to FIGS. 17–19, the duplex strainer 210 also includes a flow control assembly 230 having a cartridge 232 which is substantially identical to the cartridge 32 of the embodiment of FIGS. 1–13 in construction. Accordingly, the cartridge 232 is provided with an upper valve chamber 238a and a lower valve chamber 238b. The cartridge 232 also has a pair of upper axial holes 248a, 248b, a pair of lower axial holes 248c, 248d, a pair of lower transverse holes 248c, 248d and a pair of lower transverse holes 250c, 250d. A bottom hole 244 is formed in a bottom end of the cartridge 232, communicating with the outlet orifice 228a of the housing 212.

Referring primarily to FIG. 19, upper and lower balls 252a, 252b are mounted in the upper and lower chambers 238a, 238b, respectively, of the cartridge 232. More particularly, each of the upper and lower balls 252a, 252b has a pair of openings 254a, 254b which communicate with each other and which are oriented from one another by about 90° (i.e., the opening 254a lies in a plane that is substantially normal to the plane in which the opening 254b lies). Each of the upper and lower balls 252a, 252b also has a pair of arcuate sealing surfaces 256a, 256b formed thereon opposite the openings 254a, 254b, respectively. An opening 254c is formed in a lower surface of the lower ball 252b, communicating with the openings 254a, 254b of same. In other words, the opening 254c of the lower ball 252b is oriented about 90° relative to the openings 254a, 254b of the lower ball 252b. The lower ball 252b is mounted in the lower chamber 238b in such a manner that the opening 254c of the lower ball 252b is constantly aligned with the bottom hole 244 of the cartridge 232.

Referring to FIGS. 16–19, a handle 284 is pivotally mounted on the cartridge 232 for rotating the upper and lower balls 252a, 252b. More particularly, the handle 284 is pivotable about 90° between its first position (indicated by a broken line representation of the handle 284 in FIG. 16) and its second position (indicated by a solid line representation of the handle 284 in FIG. 16) so as to rotate the upper and lower balls 252a, 252b between their first and second positions. When the handle 284 is in its second position, the openings 254a, 254b of the upper ball 252a are aligned with the inlet orifice 224a and the upper orifice 222b, respectively, of the housing 212 (see FIG. 18), while the sealing surface 256b of the upper ball 252a is aligned with the upper orifice 222a and thereby obstructs same in a liquid-tight manner (see FIG. 17). The opening 254b of the lower ball 252b is aligned with the lower orifice 222d of the housing 212, while the sealing surface 256b of the lower ball 252b is aligned with the lower orifice 222c and thereby obstructs same in a liquid-tight manner (see FIG. 17). As a result, liquid flows into the housing 212 through the inlet orifice 224a (as indicated by arrow H in FIG. 18) and then flows to the outer bore 214b through the openings 254a, 254b of the upper ball 252a and through the upper axial hole 248b of the cartridge 232 and the upper orifice 222b of the housing 212 (as indicated by arrow I in FIG. 17). Next, the liquid flows to the intermediate bore 214c from the outer bore 214b through the lower orifice 222d of the housing 212 and the lower axial hole 248d of the cartridge 232 (as indicated by arrow J in FIG. 17) and then flows to the outlet 228 through the openings 254b, 254c of the lower ball 252b and through the bottom hole 244 of the cartridge 232 and the outlet orifice 228a of the housing 212 (as indicated by arrow K in FIGS. 17 and 18).

When the handle 284 is moved to its first position, the openings 254a, 254b of the upper ball 252a are aligned with the upper orifice 222a and the inlet orifice 224a, respectively, of the housing 212, while the sealing surface 256a of the upper ball 252a is aligned with the upper orifice 222b and thereby obstructs same in a liquid-tight manner. The opening 254a of the lower ball 252b is aligned with the lower orifice 222c of the housing 212, while the sealing surface 256a of the lower ball 252b is aligned with the lower orifice 222d and thereby obstructs same in a liquid-tight manner. As a result, liquid enters the housing 212 through the inlet orifice 224a and then flows to the outer bore 214a through the openings 254b, 254a of the upper ball 252a and through the upper axial hole 248a of the cartridge 232 and the upper orifice 222a of the housing 212. Next, the liquid flows to the intermediate bore 214c from the outer bore 214a through the lower orifice 222c of the housing 212 and the lower axial hole 248c of the cartridge 232 and then flows to the outlet 228 through the openings 254a, 254c of the lower ball 252b and through the bottom hole 244 of the cartridge 232 and the outlet orifice 228a of the housing 212.

It will be understood that the embodiments described herein are merely exemplary and that a person skilled in the art may make many variations and modifications without departing from the spirit and scope of the invention. All such variations and modifications are intended to be included within the scope of the invention as defined in the appended claims.

We claim:
1. A fluid handling apparatus, comprising:
  (a) a housing having a hollow therein with substantially parallel opposing longitudinal wall surfaces, said housing having a primary fluid inlet and a primary fluid outlet, a first intermediate outlet, a first intermediate inlet, a second intermediate outlet and a second intermediate inlet, each communicating with said hollow;
  (b) a flow control assembly slidably and removably insertable into said hollow of said housing, said flow control assembly including a cartridge having a first chamber and a second chamber separated by a dividing wall, said cartridge having a valve device extending therein and rotatable therein, a first portion of said valve device positioned within said first chamber and a second portion of said valve device positioned within said second chamber, said first chamber having an inlet opening communicating with said primary fluid inlet, said second chamber having an outlet opening communicating with said primary fluid outlet, said first chamber having first and second intervening outlets communicating with said first and second intermediate inlets of said housing, respectively, said second chamber having first and second intervening inlets communicating with said first and second intermediate outlets of said housing, respectively, said first portion of said valve device having a first fluid passage therethrough communicating with said inlet opening of said first chamber and said first intervening outlet in a first position of said valve device and communicating with said inlet opening of said first chamber and said second intervening outlet in a second position of said valve device, said second portion of said valve device having a second fluid passage therethrough communicating with said first intervening inlet opening and said outlet opening of said second chamber in said first position of said valve device and communicating with said second intervening inlet opening and said outlet opening of said second chamber in said second position of said valve assembly.
2. The fluid handling apparatus of claim 1, further including a plurality of generally tubular seals each interposed between and effecting a liquid-tight seal between said valve device and a surface of said hollow peripheral to an associated one of said first and second intermediate inlets and outlets, with an interior conduit of each of said seals permitting a flow of fluid therethrough.

3. The fluid handling apparatus of claim 2, wherein said hollow is generally cylindrical and each of said tubular seals has a concave seat at one end for slidably and sealingly contacting said valve device and a convex end mating with the inner curvature of said hollow.

4. The fluid handling apparatus of claim 3, wherein said each of said seals is composite, a first portion thereof having said concave seat and a second portion thereof fitting coaxially over said first portion and having said convex end.

5. The fluid handling apparatus of claim 3, wherein said cartridge has an internally projecting cylinder associated with each of said intervening inlets and outlets, each said cylinder being disposed at right angles to the axis of said cartridge and slidably receiving a corresponding one of said tubular seals in piston-fashion.

6. The fluid handling apparatus of claim 5, wherein said valve device includes a pair of balls with fluid passageways therethrough, a first of said pair of balls received within said first chamber and a second of said pair of balls received within said second chamber, each of said pair of balls having dimensions permitting them to be inserted through at least one of said cylinders, each of said pair of balls being retained in said first and second chambers, respectively, by said tubular seals.

7. The fluid handling apparatus of claim 6, wherein said fluid passageway of each of said balls is L-shaped.

8. The fluid handling apparatus of claim 6, wherein said fluid passageway of each of said balls is T-shaped.

9. The fluid handling apparatus of claim 1, wherein said flow control assembly selectively directs a fluid flow entering said primary fluid inlet to one side of a duplex strainer prior to exiting said primary fluid outlet.

* * * * *

UNITED STATES PATENT AND TRADEMARK OFFICE
CERTIFICATE OF CORRECTION

PATENT NO. : 6,197,195 B1
DATED : March 6, 2001
INVENTOR(S) : Walter A. Booth et al.

It is certified that error appears in the above-identified patent and that said Letters Patent is hereby corrected as shown below:

<u>Column 4,</u>
Line 17, delete "SOc" and insert -- "50c" --.

<u>Column 7,</u>
Line 58, delete "Soc" and insert -- 50c --; and
Line 61, delete "Sob" and insert -- 50b" --.

Signed and Sealed this

Nineteenth Day of August, 2003

JAMES E. ROGAN
*Director of the United States Patent and Trademark Office*